United States Patent
Tarao et al.

(10) Patent No.: US 9,259,617 B2
(45) Date of Patent: Feb. 16, 2016

(54) GOLF BALL

(75) Inventors: Toshiyuki Tarao, Kobe (JP); Kazuhiko Isogawa, Kobe (JP); Kuniyasu Horiuchi, Kobe (JP); Hirokazu Okamoto, Amagasaki (JP); Masahiko Shiraishi, Amagasaki (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 666 days.

(21) Appl. No.: 13/079,850

(22) Filed: Apr. 5, 2011

(65) Prior Publication Data

US 2011/0244989 A1  Oct. 6, 2011

(30) Foreign Application Priority Data

Apr. 6, 2010 (JP) ................................. 2010-087540

(51) Int. Cl.

| A63B 37/12 | (2006.01) |
|---|---|
| A63B 37/00 | (2006.01) |
| C08G 18/00 | (2006.01) |
| C08G 18/02 | (2006.01) |
| C08G 18/10 | (2006.01) |
| C08G 18/12 | (2006.01) |

(52) U.S. Cl.
CPC ............ *A63B 37/0022* (2013.01); *C08G 18/00* (2013.01); *C08G 18/02* (2013.01); *C08G 18/10* (2013.01); *C08G 18/12* (2013.01); *A63B 37/0031* (2013.01); *A63B 37/0033* (2013.01)

(58) Field of Classification Search
CPC .......... A63B 37/0022; C08G 18/7806; C08G 18/7831; C08G 18/791; C08G 18/792
See application file for complete search history.

(56) References Cited

U.S. PATENT DOCUMENTS

| 5,409,233 | A | * | 4/1995 | Kennedy ..................... 473/377 |
|---|---|---|---|---|
| 5,695,414 | A | * | 12/1997 | Yokota ....................... 473/384 |
| 6,180,714 | B1 | | 1/2001 | Ohira et al. |
| 6,210,295 | B1 | * | 4/2001 | Yoneyama .................. 473/378 |
| 6,309,706 | B2 | * | 10/2001 | Maruoka et al. .......... 427/385.5 |
| 6,454,667 | B1 | * | 9/2002 | Iwami ........................ 473/378 |
| 6,509,410 | B2 | * | 1/2003 | Ohira et al. ................. 524/591 |
| 6,943,213 | B2 | * | 9/2005 | Kuntimaddi ................ 525/127 |
| 2001/0034398 | A1 | * | 10/2001 | Ohira et al. ................. 524/500 |
| 2003/0050425 | A1 | * | 3/2003 | Kennedy et al. ............. 528/55 |
| 2003/0176242 | A1 | * | 9/2003 | Mano ........................ 473/378 |
| 2004/0043838 | A1 | * | 3/2004 | Isogawa et al. ............ 473/378 |

(Continued)

FOREIGN PATENT DOCUMENTS

| JP | 2000-167085 A | 6/2000 |
|---|---|---|
| JP | 2000-288125 A | 10/2000 |

(Continued)

OTHER PUBLICATIONS

English Translation of Japanese Office Action dated Jul. 30, 2013 for Application No. 2010-087540.

*Primary Examiner* — John E Simms, Jr.

(74) *Attorney, Agent, or Firm* — Birch Stewart Kolasch & Birch, LLP

(57) ABSTRACT

An object of the present is to provide a golf ball having a high spin rate on approach shots under the wet condition and rough condition. The present invention provides a golf ball comprising a golf ball body, and a paint film formed on a surface of the golf ball body, wherein the paint film has a martens hardness of 2.0 mgf/$\mu m^2$ or less, and a ratio (50% modulus/10% modulus) of 50% modulus to 10% modulus of 1.6 or more.

22 Claims, 1 Drawing Sheet

(56) References Cited

U.S. PATENT DOCUMENTS

| | | |
|---|---|---|
| 2004/0116623 A1* | 6/2004 | Isogawa et al. ............... 525/453 |
| 2005/0282660 A1* | 12/2005 | Isogawa et al. ............... 473/378 |
| 2005/0282661 A1* | 12/2005 | Fujisawa et al. ............. 473/378 |
| 2006/0084757 A1* | 4/2006 | Isogawa et al. ............... 524/591 |
| 2008/0064530 A1* | 3/2008 | Matroni et al. ............... 473/378 |
| 2009/0054176 A1* | 2/2009 | Isogawa et al. ............... 473/378 |
| 2009/0124429 A1* | 5/2009 | Hirau et al. ................... 473/377 |
| 2010/0234485 A1* | 9/2010 | Kohli Steck et al. ......... 522/174 |
| 2011/0207557 A1* | 8/2011 | Lutz et al. ..................... 473/378 |
| 2011/0224020 A1* | 9/2011 | Tachibana et al. ............ 473/373 |

FOREIGN PATENT DOCUMENTS

| | | | |
|---|---|---|---|
| JP | 2002-53799 A | 2/2002 | |
| JP | 2003-265650 A | 9/2003 | |
| JP | 2006-75209 A | 3/2006 | |
| JP | 2006-75210 A | 3/2006 | |
| WO | WO 2009050115 A1 * | 4/2009 | ............. C08G 18/22 |

* cited by examiner

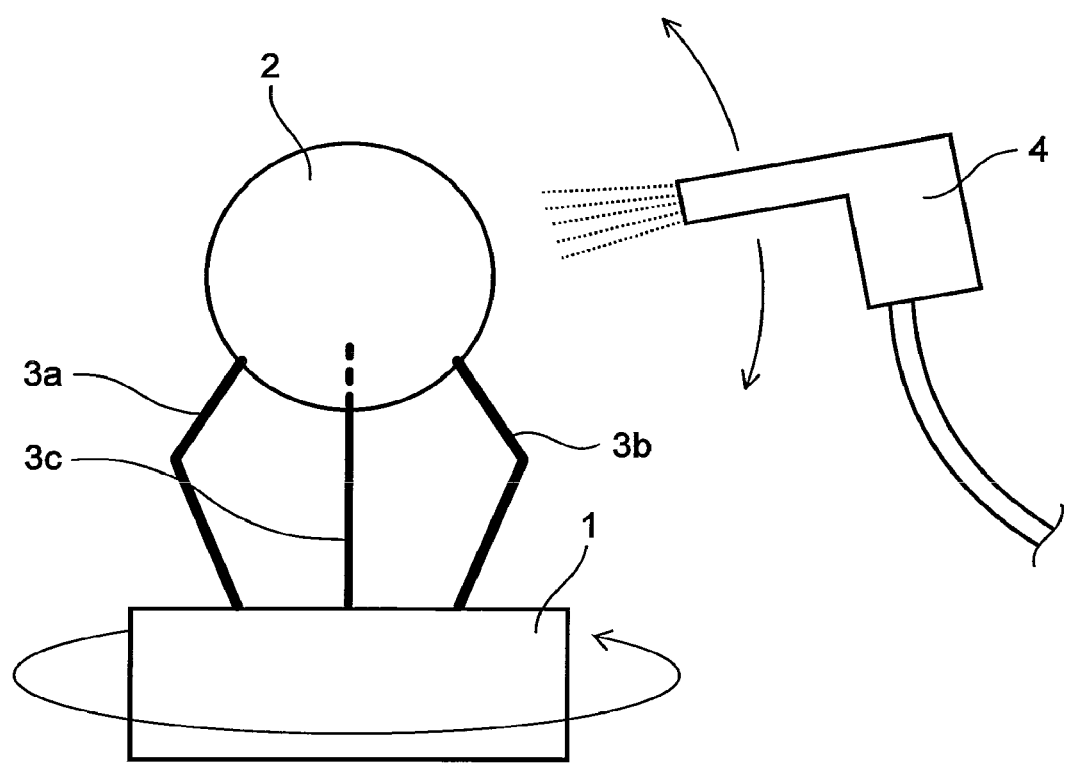

GOLF BALL

FIELD OF THE INVENTION

The present invention relates to a painted golf ball.

DESCRIPTION OF THE RELATED ART

Since 2010, a new groove regulation has entered in force in a professional golf world on clubs having a loft angle of 25° or more such as irons or wedges. This new regulation will be gradually applied to amateur golfers. Since this regulation reduces the spin rate on approach shots with irons or wedges, it becomes difficult to stop the golf ball on the green. Based on this background, golf balls that have a higher spin rate in order to stop easily on the green are required. Especially, on approach shots under a wet condition or rough condition, since golf balls tend to slip on the club faces, imparting the spin is difficult. Therefore, it is required to increase the spin rate on approach shots under a wet condition and rough condition. As a method for increasing the spin rate on approach shots, employing a soft material for a cover material is known.

The paint film is formed on a surface of the golf ball body. The improvement of the golf ball properties has been proposed by improving the paint film. For example, Japanese Patent Publication No. 2006-75209 A and 2006-75210 A propose a golf ball that stops easily on the green by increasing the launch angle. Japanese Patent Publication No. 2006-75209 A discloses a golf ball comprising a golf ball body and a paint film covering the golf ball body, wherein a resin component constituting the paint film is cured by a polyamide type curing agent and the golf ball has a static friction coefficient of 0.22 or less. Japanese Patent Publication No. 2006-75210 A discloses a golf ball comprising a golf ball body and a paint film covering the golf ball body, wherein the paint film contains a metal particle. Japanese Patent Publication No. 2000-288125 A discloses a golf ball having an improved abrasion resistance and durability. The golf ball having an excellent durability comprises a core, a cover, and at least one paint layer formed on the cover, wherein the cover has a Shore D hardness of 50 to 65 and a flexural modulus of 1,000 to 2,000 kgf/cm$^2$, and at least outermost layer of the paint has a 10% modulus of 5 to 50 kgf/cm$^2$. Japanese Patent Publication No. 2003-265650 A proposes a golf ball having an improved spin retention without sacrificing the requirements for the paint film. Japanese Patent Publication No. 2003-265650 A discloses a golf ball comprising a core, at least one cover layer covering the core, and a paint film formed on an outer surface of the cover, wherein a thickness of the paint film is 25 μm to 125 μm, a 50% modulus of the paint film is 5 MPa to 50 MPa, and a value R expressed by an equation (1) is from 0.01 to 0.5:

$$R = PL/CL/1{,}000 \quad (1)$$

where CL (mm) represents a thickness of an outermost layer of the cover, and PL (μm) represents a thickness of the paint film.

SUMMARY OF THE INVENTION

The present invention has been made in view of the above problems, and an object of the present is to provide a golf ball having a high spin rate on approach shots under the wet condition and rough condition.

The inventors of the present invention have focused on the paint film to address the above problem, and have achieved the present invention based on the findings that the spin rate on approach shots under the wet condition and rough condition can be increased by employing a specific paint film. The present invention that has solved the above problem provides a golf ball comprising a golf ball body, and a paint film formed on a surface of the golf ball body, wherein the paint film has a martens hardness of 2.0 mgf/μm$^2$ or less, and a ratio (50% modulus/10% modulus) of 50% modulus to 10% modulus of 1.6 or more. Since the paint film having a martens hardness of 2.0 mgf/μm$^2$ or less is soft, the spin rate on approach shots under the wet condition increases. Further, not only using a soft paint film but also making the paint film have a specific ratio of 50% modulus to 10% modulus leads to the higher spin rate under the rough condition. The paint film preferably has a 10% modulus of 100 kgf/cm$^2$ or less, more preferably 50 kgf/cm$^2$ or less. The paint film preferably has a 50% modulus of 30 kgf/cm$^2$ or more.

According to the present invention, it is possible to provide a golf ball producing a high spin rate on approach shots under the wet condition and rough condition.

BRIEF DESCRIPTION OF THE DRAWINGS

FIG. 1 is a schematic view illustrating an embodiment applying the paint with an air gun.

DESCRIPTION OF THE PREFERRED EMBODIMENT

The present invention provides a golf ball comprising golf ball body, and a paint film formed on a surface of the golf ball body, wherein the paint film has a martens hardness of 2.0 mgf/μm$^2$ or less, and a ratio (50% modulus/10% modulus) of 50% modulus to 10% modulus of 1.6 or more.

In the present invention, the paint film formed on a surface of the golf ball body preferably has a martens hardness of 2.0 mgf/μm$^2$ or less, more preferably 1.4 mgf/μm$^2$ or less, even more preferably 1.0 mgf/μm$^2$ or less, most preferably 0.18 mgf/μm$^2$ or less. The martens hardness can be measured by a later described method and is suitable for measuring a hardness in a micro region. If the martens hardness is 2.0 mgf/μm$^2$ or less, the paint film is soft enough to produce a high spin rate under the wet condition. There is no lower limitation on the martens hardness, but the martens hardness is preferably 0.01 mgf/μm$^2$ or more. If the martens hardness is too low, the paint film is too soft and tacky.

The paint film preferably has a 10% modulus of 100 kgf/cm$^2$ or less, more preferably 50 kgf/cm$^2$ or less. If the 10% modulus is 100 kgf/cm$^2$ or less, the paint film is soft and the spin rate on approach shots under the wet condition increases. There is no lower limitation on the 10% modulus, but the 10% modulus is preferably 5 kgf/cm$^2$ or more, more preferably 10 kgf/cm$^2$ or more. If the 10% modulus is too low, the paint film becomes too soft and tacky. Thus, the feeling becomes bad.

The paint film preferably has a 50% modulus of 30 kgf/cm$^2$ or more, more preferably 40 kgf/cm$^2$ or more. Making the paint film have the 50% modulus of 30 kgf/cm$^2$ or more increase the spin rate on approach shots under the rough condition. There is no upper limit on the 50% modulus, but the 50% modulus is preferably 200 kgf/cm$^2$ or less, more preferably 180 kgf/cm$^2$ or less. If the 50% modulus is too high, the paint film becomes too hard and the spin rate under the rough condition becomes low.

The paint film formed on a surface of the golf ball body preferably has a ratio (50% modulus/10% modulus) of 50% modulus to 10% modulus of 1.6 or more, more preferably 2.0 or more, even more preferably 2.5 or more. If the ratio of 50% modulus to 10% modulus is 1.6 or more, the spin rates under the wet condition and rough condition increase. There is no upper limit on the ratio (50% modulus/10% modulus) of 50% modulus to 10% modulus, but the ratio of 50% modulus to 10% modulus is preferably 15 or less, more preferably 12 or less, even more preferably 10 or less.

The base resin constituting the paint preferably includes polyurethane obtained by a reaction between a polyol component and a polyisocyanate component. Appropriately selecting the polyol component and the polyisocyanate component provides a paint film having a desired mechanical properties.

Examples of the polyol component include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-$\epsilon$-caprolactone (PCL); a polycarbonate polyol such as polyhexamethylene carbonate; a urethane polyol; and an acrylic polyol.

The urethane polyol is a compound having a plurality of urethane bonds in its molecule, and having at least two hydroxyl groups in a molecule thereof. The urethane polyol is, for example, a hydroxyl group terminated urethane prepolymer, which is obtained by a reaction between a polyisocyanate component and a polyol component, under a condition that the hydroxyl groups of the polyol component is excessive to the isocyanate groups of the polyisocyanate component.

The polyisocyanate component which can constitute the urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

The acrylic polyol is an acrylic resin or acrylic polymer having a plurality of hydroxyl groups, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl (meth)acrylate, 2-hydroxypropyl(meth)acrylate, 2-hydroxybutyl(meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include (meth)acrylic unsaturated carboxylic acids such as (meth)acrylic acid; (meth)acrylic acid ester such as methyl(meth)acrylate, ethyl(meth)acrylate, propyl (meth)acrylate, isopropyl(meth)acrylate, butyl(meth)acrylate, isobutyl (meth)acrylate, pentyl(meth)acrylate, hexyl (meth)acrylate, 2-ethylhexyl (meth)acrylate, cyclohexyl (meth)acrylate, octyl(meth)acrylate, and decyl (meth) acrylate; and another (meth)acrylic monomer such as (meth) acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, the acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and $\alpha$-methyl styrene; and ethylenically unsaturated carboxylic acids such as maleic acid and itaconic acid. These other monomer components may be used individually or in combination of two or more of them.

The hydroxyl value of the polyol component is preferably 10 mg KOH/g or more, and more preferably 15 mg KOH/g or more, and even more preferably 20 mg KOH/g or more, and is preferably 400 mg KOH/g or less, and more preferably 390 mg KOH/g or less, and even more preferably 380 mg KOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

The weight average molecular weight of the polyol component is preferably 500 or more, and more preferably 550 or more, and even more preferably 600 or more, and is preferably 150,000 or less, and more preferably 140,000 or less, and even more preferably 130,000 or less. If the weight average molecular weight of the polyol component falls within the above range, the water-resistance and impact-resistance of the paint film can be enhanced. The weight average molecular weight of the polyol component can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K.K.).

Specific examples of the polyol component are 121 B available from Wayaku Paint Co.; Nippollan 800, Nippollan 1100 available from Nippon Polyurethane Industry Co., Ltd; Burnock D6-627, Burnock D8-436, Burnock D8-973, Burnockll-408 available from DIC Corporation; Desmophen 650 MPA, Desmophen 670, Desmophen 1150, Desmophen A160X available from Sumika Bayer Urethane Co., Ltd; Hariacron 2000, Hariacron 8500H available from Harima Chemicals, Inc; Polin #950, Polin #860 available from Shinto Paint Co., Ltd.

Next, the polyisocyanate component will be described. The polyisocyanate component includes, for example, any compound having a plurality of isocyanate groups.

The polyisocyanate component includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI) and derivatives thereof. These may be used either alone or as a mixture of at least two of them.

Examples of the derivative of the polyisocyanate include: an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. One example of the allophanate-modified product is a trifunctional polyisocyanate which is obtained by further reacting a diisocyanate with a urethane bond formed through a reaction between a diisocyanate and a low molecular weight diol. The biuret-modified products is, for example, a trifunctional polyisocyanate which is represented by the following formula (1). The isocyanurate of diisocyanate is, for example, a trifunctional polyisocyanate which is represented by the following formula (2). In the formulae (1) and (2), R represent a residue where isocyanate groups are removed from the diisocyanate. The polyisocyanates and the derivatives thereof may be used individually or in combination of two or more types.

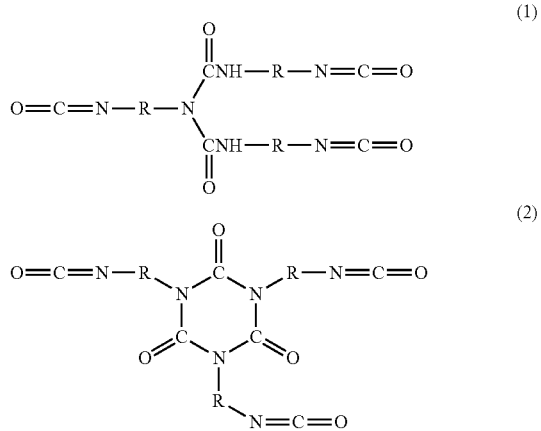

In the present invention, as the polyisocyanate component, preferably used is hexamethylene diisocyanate and/or a derivative thereof, isophorone diisocyanate and/or a derivative thereof, or toluene diisocyanate and/or a derivative thereof. The polyisocyanate component more preferably includes hexamethylene diisocyanate and/or a derivative thereof, even more preferably the biuret-modified product of hexamethylene diisocyanate represented by the above formula (1). Further, a mixture of the biuret-modified product of hexamethylene diisocyanate and other polyisocyanate components may be used. As the other polyisocyanate component, an isocyanurate of isophorone diisocyanate can be exemplified. In the case of using the isocyanurate of isophorone diisocyanate with the biuret-modified product of hexamethylene diisocyanate, a mixing ratio (Biuret-modified HDI: IPDI isocyanurate) of the biuret-modified product of hexamethylene diisocyanate to the isocyanurate of isophorone diisocyanate is preferably 1:0 to 0.7:0.3. If the mixing ratio falls within the above range, the paint film having a desired hardness is obtained.

The polyisocyanate component preferably has an isocyanate content (NCO %) of 0.5 mass % or more, more preferably 1 mass % or more, even more preferably 2 mass % or more, and preferably has an isocyanate content (NCO %) of 45 mass % or less, more preferably 40 mass % or less, even more preferably 35 mass % or less. The isocyanate content (NCO %) of the polyisocyanate component can be defined by the following expression.

$NCO(\%)=100\times$[mole number of an isocyanate group in the polyisocyanate component$\times 42$(molecular weight of $NCO$)]/[total mass (g) of the polyisocyanate component]

Specific examples of the polyisocyanate component are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Duraanate TKA-100 available from Asahi Kasei Corporation; Vestanat T1890 available from Degussa.

In a reaction between the polyol component and the polyisocyanate component, the molar ratio (NCO/OH) of the isocyanate group (NCO) of the polyisocyanate component to the hydroxyl group (OH) of the polyol component is preferably 1.0 or more, more preferably 1.1 or more. If the molar ratio (NCO/OH) is less than 1.0, the curing reaction may become insufficient. Further, if the molar ratio (NCO/OH) is too large, the amount of the isocyanate groups is excessive, and the appearance of the obtained paint film may deteriorate as well as the obtained paint film may be hard and fragile. Thus, the molar ratio (NOC/OH) is preferably 1.4 or less, more preferably 1.3 or less. The reason why the appearance of the obtained paint film deteriorates if the amount of the isocyanate group is excessive is that an excessive amount of isocyanate groups in the paint may promote a reaction between the moisture in the air and the isocyanate groups, thereby generating a lot of carbon dioxide gas.

The paint film of the golf ball of the present invention preferably contains a filler. If the paint film contains a filler, the paint film tends to exhibit a desired mechanical properties. The filler includes, for example, oxides such as titanium oxide (refraction index: 2.52 to 2.76), zinc oxide, and magnesium oxide (refraction index: 1.77); hydroxides such as aluminum hydroxide (refraction index: 1.57 to 1.65), and magnesium hydroxide (refraction index: 1.56); calcium carbonate (refraction index: 1.65); barium sulfate (refraction index: 1.64); and clay minerals such as kaolinite, halloysite, chrysotile, talc (refraction index: 1.54 to 1.59), smectite, vermiculite, mica (refraction index: 1.56 to 1.58). Among them, the paint film of the golf ball of the present invention preferably contains at least one filler selected from the group consisting of titanium oxide, barium sulfate, talc, calcium carbonate, clay, and white carbon.

If the filler having a refraction index which is close to the refraction index of the base resin constituting the paint film is selected as the filler, the paint film having a high transparency is obtained. For example, use of (precipitated) barium sulfate as the filler provides a highly transparent clear paint through which the mark is visible even if the paint film is formed after the mark is formed on the golf ball body. This clear paint is useful for the colored golf balls. On the other hand, use of the filler having high opacifying power like titanium oxide provides an enamel paint, that is, a white paint film is formed. In this case, the mark should be formed after the paint film is formed.

The content of the filler in the paint film is preferably 10 mass % or more, more preferably 15 mass % or more, even more preferably 20 mass % or more, and is preferably 50 mass % or less, more preferably 45 mass % or less, even more preferably 40 mass % or less. If the content of the filler is 10 mass % or more, the 50% modulus of the paint film becomes high, and thus the spin performance under the rough condition improves. On the other hand, if the content of the filler is more than 50 mass %, the gloss of the paint film diminishes and the appearance after paint application tends to be worse.

The paint film of the golf ball of the present invention is preferably formed from a paint containing a polyol component and a polyisocyanate component. Preferable example of the paint is a two-component curing type paint. The paint may be either a waterborne paint mainly containing water as a dispersion medium or a solvent-base paint mainly containing an organic solvent as a dispersion medium. In the case of the solvent-base paint, preferable solvents are toluene, isopropyl alcohol, xylene, methyl ethyl ketone, methyl isobutyl ketone, ethyleneglycol monomethyl ether, ethyl benzene, propyleneglycol monomethyl ether, isobutyl alcohol, and ethyl acetate.

The paint may contain additives such as an ultraviolet absorber, an antioxidant, a light stabilizer, a fluorescent brightener, an anti-blocking agent, a leveling agent, a slip agent, and a viscosity modifier, which are generally contained in the paint for a golf ball, where necessary, in addition to the polyol component, the polyisocyanate component and the filler.

Next, the applying method of the curing type polyurethane paint used in the present invention will be described. The method of applying the curing type polyurethane paint is not limited, and includes a conventional method for the mixing type paint, for example, spray coating method or electrostatic coating method.

In the case of applying the paint with the air gun, the polyol component and the polyisocyanate component may be fed with the respective pumps and continuously mixed in a constant ratio through the line mixer such as the static mixer located in the stream line just before the air gun, and the obtained mixture can be air-sprayed. Alternatively, the polyol component and the polyisocyanate component can be air-sprayed respectively with the spray gun having the device for controlling the mixing ratio thereof. The paint application may be conducted by spraying the paint one time or over-spraying the paint multiple times.

The curing type polyurethane paint applied to the golf ball body is dried at the temperature ranging from 30° C. to 70° C. for 1 hour to 24 hours to form a paint film.

The thickness of the paint film after drying is preferably, without limitation, 5 μm or more, more preferably 6 μm or more, even more preferably 10 μm or more, most preferably 15 μm or more. If the thickness is less than 5 μm, the paint film is likely to wear off due to the continued use. Further, thickening the paint film increase the spin rate on approach shots under the wet condition. The thickness of the paint film is preferably 40 μm or less, more preferably 38 μm or less, even more preferably 30 μm or less. If the thickness is more than 40 μm, the effect of the dimples is lowered, and thus the flying performance of the golf ball tends to be low. The thickness of the paint film can be measured, for example, by observing a cross section of the golf ball using a microscope (VHX-1000 available from Keyence Corporation). In the case of over-painting the paint, a total thickness of the whole paint films formed preferably falls within the above range. In the present invention, it is preferable that the paint film having a thickness of 15 μm or more is formed by overpainting at least two times. Thickening the paint film provides the higher wet spin retention and rough spin retention.

The golf ball construction is not limited, as long as the golf ball of the present invention comprises a golf ball body and a paint film formed on a surface of the golf ball body. The golf ball body of the present invention may be a one-piece golf ball, a two-piece golf ball, a multi-piece golf ball including a three-piece golf ball, or a wound golf ball. The present invention can be applied appropriately to any one of the above golf balls.

The golf ball of the present invention is preferably a golf ball that comprises a core and a cover covering the core. In this case, the cover preferably has a hardness of 61 or less, more preferably 55 or less, even more preferably 45 or less, most preferably 40 or less in Shore D hardness. If the cover has a hardness of 61 or less in Shore D hardness, the spin rates under the wet condition and rough condition becomes higher. There is no lower limitation on the hardness of the cover, but the cover preferably has a hardness of 20 or more, more preferably 25 or more, even more preferably 30 or more in Shore D hardness. The hardness of the cover is a slab hardness obtained by measuring the cover composition for forming the cover molded into a sheet form.

Examples of the cover material constituting the cover include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and a thermoplastic polystyrene elastomers having a trade name "Rabalon (registered trademark)(e.g. "Rabalon T3221C")" and a thermoplastic polyester elastomer having a trade name "Primalloy" commercially available from Mitsubishi Chemical Corporation, and the like. These cover materials may be used solely or in combination of two or more types thereof.

The cover in the present invention may contain a pigment component such as a white pigment (for example, titanium oxide), a blue pigment, a red pigment, or the like, a specific gravity adjusting agent such as zinc oxide, calcium carbonate barium sulfate, or the like, a dispersant, an antioxidant, an ultraviolet absorber, a light stabilizer, a fluorescent material or a fluorescent brightener, or the like, as long as they do not impair the performance of the cover.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding a cover, the concave portions called "dimple" are usually formed on the surface. The total number of the dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them. After the cover is molded, the mold is opened and the golf ball body is taken out from the mold, and as necessary, the golf ball body is preferably subjected to surface treatments such as deburring, cleaning, and sandblast. If desired, a mark may be formed.

Next, the core used for the wound golf ball, two-piece golf ball, multi-piece golf ball, and the one-piece golf ball body will be explained.

As the core or the one-piece golf ball body, a conventionally known rubber composition (hereinafter simply referred to as "core rubber composition" occasionally) may be employed, and they can be molded by, for example, heat-pressing a rubber composition containing a base rubber, a crosslinking initiator, and a co-crosslinking agent.

As the base rubber, typically preferred is the high cis-polybutadiene having cis-1,4-bond in a proportion of 40% or more, more preferably 70% or more, even more preferably 90% or more in view of its superior repulsion property. The co-crosslinking agent includes; for example, $\alpha,\beta$-unsaturated carboxylic acid having 3 to 8 carbon atoms or a metal salt thereof, more preferably a metal salt of acrylic acid or methacrylic acid. As the metal constituting the metal salt, for example, zinc, magnesium, calcium, aluminum and sodium may be used, and among them, zinc is preferred. The amount of the co-crosslinking agent to be used is preferably 20 parts or more, and is preferably 50 parts or less. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. The core rubber composition may further contain an organic sulfur compound. As the organic sulfur compound, a diphenyl disulfide or a derivative thereof may be preferably used. The amount of the organic sulfur compound is preferably 0.1 part by mass or more, more preferably 0.3 part by mass or more, and preferably 5.0 parts by mass or less, more preferably 3.0 parts by mass or less relative to 100 parts by mass of the base rubber.

The core rubber composition may further contain a gravity adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

In the case that the golf ball of the present invention is a multi-piece golf ball including a three-piece golf ball, the material for the intermediate layer disposed between the core and the cover includes a thermoplastic resin such as a polyurethane resin, an ionomer resin, a polyamide resin, and polyethylene; and a thermoplastic elastomer such as a polystyrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and an $\alpha,\beta$-unsaturated carboxylic acid with a metal ion, and one prepared by neutralizing at least a part of carboxyl groups in a terpolymer composed of ethylene, an $\alpha,\beta$-unsaturated carboxylic acid and an $\alpha,\beta$-unsaturated carboxylic acid ester with a metal ion. The intermediate layer may further contain a specific gravity adjusting agent such as barium sulfate, tungsten and the like, an antioxidant, and a pigment.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Appearance of the Painted Golf Ball

The appearance of the painted golf ball was visually observed, and evaluated in accordance with the following evaluation criteria.

Evaluation Criteria

E (Excellent): a state in which the surface was very smooth and very glossy.

G (Good): a state in which the surface was smooth and glossy.

F (Fair): a state in which the surface was slightly uneven, and was not so glossy.

P (Poor): a state in which the surface was substantially uneven, and was not glossy.

(2) Martens Hardness of the Paint Film

The martens hardness was measured using Nano indenter "ENT-2100" available from ELIONIX. INC. The measuring conditions are as follows.

Load F: 20 mgf
Angle $\alpha$ of Berkovich indenter: 65.03°
Material of Berkovich indenter: $SiO_2$
Based on the depth (h) of indentation and angle ($\alpha$) of indenter, an area As(h) can be calculated by the following expression.

$$As(h) = 3 \times 3^{1/2} \times \tan \alpha / \cos \alpha \times h^2$$

Based on the load F and area As(h), the martens hardness can be calculated by the following expression.

$$\text{Martens Hardness} = F/As(h)$$

Measuring Sample: The base material and curing agent were blended to prepare a paint. The paint was dried and cured at 40° C. for 4 hours to prepare a paint sheet having a thickness of 100 μm. This paint sheet was used for the measurement of the martens hardness.

(3) Mechanical Properties of the Paint Film

The base material and curing agent were blended to prepare a paint. The paint was dried and cured at 40° C. for 4 hours to prepare a paint film. This paint film was punched out in a dumbbell shape to prepare test pieces. The mechanical properties of the paint film were measured using a tensile tester manufactured by SHIMAZU CORPORATION. The modulus at 10% elongation and 50% elongation were calculated. In the case of blending an additive such as a filler, the mechanical properties of the paint film containing the additive were measured.

Thickness of Test piece: 0.05 mm
Crosshead Speed: 50 mm/min.

(4) Spin Rate on Approach Shots (Dry Spin, Wet Spin, Spin Retention)

A sand wedge (CG15 forged wedge (52°) manufactured by Cleveland Golf) was installed on a swing robot available from Golf Laboratories, Inc. A golf ball was hit at a head speed of 21 m/sec., and a sequence of photographs of the hit golf ball were taken for measuring the spin rate (rpm). The measurement was performed ten times for each golf ball, and the average value is regarded as the spin rate (rpm). "Dry spin rate (Sd)" means the spin rate where the test was conducted under the condition that a club face and a golf ball were dry. "Wet spin rate (Sw)" means the spin rate where the test was conducted under the condition that a club face and a golf ball were wet with water. The spin retention can be calculated by the following expression.

Wet spin retention($Rs$)=100×Wet spin rate($Sw$)/Dry spin rate($Sd$)

(5) Spin Rate on Approach Shots Under Rough Condition

The spin rates (rpm) were measured on about 50 yard-approach shots which ten testers having a handicap of 10 or less hit from the rough in the golf course. The measurement was conducted by hitting each golf ball with a CG15 forged wedge (52°) manufactured by Cleveland Golf from the rough where the length of the lawn was about 5 cm. A sequence of photographs of the hit golf ball were taken for measuring the spin rate (rpm). The average value of the ten testers is regarded as the spin rate(rpm).

Rough spin retention($Rs$)=100×Rough spin rate($Sr$)/Dry spin rate($Sd$)

[Production of the Golf Ball]
(1) Preparation of Center

The center rubber composition having formulation shown in Table 1 was kneaded and pressed in upper and lower molds, each having a hemispherical cavity, at a temperature of 170° C. for 20 minutes to obtain the center in a spherical shape (diameter 39.3 mm).

TABLE 1

| Center rubber composition | Parts by mass |
|---|---|
| Polybutadiene rubber | 100 |
| Zinc acrylate | 35 |
| Zinc oxide | 5 |
| Barium sulfate | Appropriate amount*) |
| Diphenyl disulfide | 0.5 |
| Dicumyl peroxide | 0.9 |

Notes on table 1:
*)Depending on the cover composition, adjustment was made such that the golf ball had a mass of 45.4 g.
Polybutadiene rubber: "BR730 (high cis-polybutadiene)" manufactured by JSR Corporation
Zinc acrylate: "ZNDA-90S" manufactured by NIHON JYORYU KOGYO Co,. LTD.
Zinc oxide: "Ginrei R" manufactured by Toho-Zinc Co.
Barium sulfate: "Barium Sulfate BD" manufactured by Sakai Chemical Industry Co., Ltd.
Diphenyl disulfide: manufactured by Sumitomo Seika Chemicals Company Limited
Dicumyl peroxide: "Percumyl D" manufactured by NOF Corporation (2) Preparation of the Intermediate Layer Composition and Cover Composition The materials shown in Tables 2 and 3 were mixed using a twin-screw kneading extruder to obtain the intermediate layer composition and cover composition in the form of pellet. The extrusion was conducted in the following conditions: screw diameter=45 mm, screw revolutions=200 rpm, and screw L/D=35. The blended materials were heated to from 200° C. to 260° C. at the die position of the extruder.

TABLE 2

| Intermediate layer composition | parts by mass |
|---|---|
| Surly 8945 | 55 |
| Himilan AM7329 | 45 |
| Titanium dioxide | 4 |

Note on table 2
Surlyn 8945: Sodium ion neutralized ethylene-methacrylic acid copolymer ionomer resin available from E. I. du Pont de Nemours and Company
Himilan AM7329: Zinc ion neutralized ethylene-methacrylic acid copolymer ionomer resin available from Du Pont-Mitsui Polychemicals Co., Ltd

TABLE 3

| Cover composition | Parts by mass |
|---|---|
| Elastollan XNY85A | 100 |
| Titanium dioxide | 3 |
| Ultramarine blue | 0.04 |
| Slab hardness(Shore D) | 32 |

Formulation: parts by mass
Elastollan XNY85A: a thermoplastic polyurethane elastomer manufactured by BASF Japan Ltd.(Shore D: 32)

(3) Preparation of Spherical Core

The obtained intermediate layer composition was injection molded on the center which had been obtained as described above, to prepare a core consisting of the center and the intermediate layer covering the center. Upper and lower molds for molding have a spherical cavity with pimples, a part of which serves as a hold pin which is extendable and retractable. When molding the intermediate layer, the hold pins were protruded to hold the center after the center was put in, the intermediate layer composition heated to 260° C. was charged into the mold under a pressure of 80 tons within 0.3 seconds, and cooled for 30 seconds. Then, the mold was opened, and the spherical cores were taken out from the mold.

(4) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(5) Molding of the Cover

The core obtained in (3) was covered with the two half shells obtained in (4) in a concentric manner, and the cover was molded by compression molding. Compression molding was performed at a temperature of 145° C. for 2 minutes under a molding pressure of 9.8 MPa.

(6) Preparation of Paint

As shown in Tables No. 4 and No. 5, the polyol components and the polyisocyanate components, if necessary the filler, were blended to prepare paints.

(7) Formation of Paint Film

The surfaces of the golf ball bodies obtained in (5) were subjected to the sandblast treatment, and the marks were formed. The paints were applied to the golf ball bodies with the air-gun, and the paints were dried in the oven heated at 40° C. for 24 hours to prepare the golf balls having a diameter of 42.7 mm and a mass of 45.3 g. With respect to golf balls No. 1 to No. 12, and No. 17 to No. 20, the paint was overpainted two times to form the paint film having a thickness of 18 μm. With respect to golf balls No. 13 to No. 16, the paint was applied one time to form the paint film having a thickness of 9 μm. The golf ball bodies were placed in the rotating member 1 shown in FIG. 1, which rotated at 300 rpm. The application of the paint was conducted by spacing a spray distance (7 cm) between the air gun and the golf ball body and moving the air gun in a up and down direction. The painting interval in the overpainting operation was set to 1.0 second. Application of the paint was conducted in the spraying conditions of spraying air pressure: 0.15 MPa, compressed air tank pressure: 0.10 MPa, and painting time per one time: 1 second, atmosphere temperature: 20° C. to 27° C., and atmosphere humidity: 65% or less. The results of the spin rates of the obtained golf balls were also shown in Tables No. 4 and No. 5.

No. 5, each of them has a high wet spin retention of 70% or more, and a high rough spin retention of 50% or more. Golf balls No. 9 to No. 12 used barium sulfate as a filler and the highly transparent paint film was obtained. With respect to golf balls No. 8 and No. 12, the appearance of the golf ball was slightly lowered, because the content of the filler is high. Golf balls No. 2, 3, 7, 11 are different from Golf balls No. 13

TABLE 4

| | | Golf ball No. | 1 | 2 | 3 | 4 | 5 | 6 | 7 | 8 | 9 | 10 |
|---|---|---|---|---|---|---|---|---|---|---|---|---|
| Paint Formulation | Base | Polyol component 1 | — | — | — | — | — | — | 0.1 | — | — | — |
| | | Polyol component 2 | 1 | 1 | 1 | 1 | 1 | 1 | 0.9 | 1 | 1 | 1 |
| | Curing agent | Polyisocyanate component 1 | — | — | — | — | — | — | — | — | — | — |
| | | Polyisocyanate component 2 | 1 | 1 | 1 | 0.9 | 0.8 | 0.7 | 1 | 1 | 1 | 1 |
| | | Polyisocyanate component 3 | — | — | — | 0.1 | 0.2 | 0.3 | — | — | — | — |
| | Filler | Titanium oxide (mass %) | 8 | 16 | 33 | 33 | 33 | 33 | 33 | 50 | — | — |
| | | Barium sulfate (mass %) | — | — | — | — | — | — | — | — | 8 | 16 |
| Paint film Properties | | Martens Hardness (mgf/$\mu m^2$) | 0.14 | 0.15 | 0.18 | 1.4 | 1.7 | 2 | 0.12 | 1.4 | 0.14 | 0.15 |
| | | 10% modulus (kgf/cm$^2$) | 9.2 | 14.8 | 35.9 | 81.5 | 92.7 | 103.9 | 33.7 | 85.0 | 8.3 | 13.1 |
| | | 50% modulus (kgf/cm$^2$) | 28.9 | 60.2 | 127.1 | 160.0 | 165.0 | 170.0 | 122.0 | 263.0 | 26.2 | 40.2 |
| | | 50% modulus/10% modulus | 3.14 | 4.07 | 3.54 | 1.96 | 1.78 | 1.64 | 3.62 | 3.09 | 3.16 | 3.07 |
| | | Thickness of Paint film ($\mu$m) | 18 | 18 | 18 | 18 | 18 | 18 | 18 | 18 | 18 | 18 |
| Golf ball Properties | | Dry spin rate (rpm) | 6750 | 6800 | 6860 | 6850 | 6840 | 6830 | 6900 | 6800 | 6850 | 6800 |
| | | Wet spin rate (rpm) | 5200 | 5400 | 5500 | 5000 | 4900 | 4800 | 5600 | 5300 | 5200 | 5300 |
| | | Rough spin rate (rpm) | 3400 | 3750 | 3900 | 3600 | 3500 | 3450 | 4000 | 3800 | 3400 | 3700 |
| | | Wet spin retention Rs (%) | 77 | 79 | 80 | 73 | 72 | 70 | 81 | 78 | 76 | 78 |
| | | Rough spin retention Rs (%) | 50 | 55 | 57 | 53 | 51 | 51 | 58 | 56 | 50 | 54 |
| | | Appearance of Paint film | G | G | G | G | G | G | G | F | G | G |

Paint formulation: base/curing agent = NCO/OH (mole ratio)

TABLE 5

| | | Golf ball No. | 11 | 12 | 13 | 14 | 15 | 16 | 17 | 18 | 19 | 20 |
|---|---|---|---|---|---|---|---|---|---|---|---|---|
| Paint Formulation | Base | Polyol component 1 | — | — | — | — | 0.1 | — | 1 | 1 | — | — |
| | | Polyol component 2 | 1 | 1 | 1 | 1 | 0.9 | 1 | — | — | 1 | 1 |
| | Curing agent | Polyisocyanate component 1 | — | — | — | — | — | — | 0.4 | 0.4 | 0.33 | — |
| | | Polyisocyanate component 2 | 1 | 1 | 1 | 1 | 1 | 1 | 0.4 | 0.4 | 0.33 | 0.65 |
| | | Polyisocyanate component 3 | — | — | — | — | — | — | 0.4 | 0.4 | 0.33 | 0.35 |
| | Filler | Titanium oxide (mass %) | — | — | 16 | 33 | 33 | — | — | 33 | — | 33 |
| | | Barium sulfate (mass %) | 33 | 50 | — | — | — | 33 | — | — | — | — |
| Paint film Properties | | Martens Hardness (mgf/$\mu m^2$) | 0.18 | 0.21 | 0.15 | 0.18 | 0.12 | 0.18 | 4.3 | 4.2 | 0.17 | 2.2 |
| | | 10% modulus (kgf/cm$^2$) | 19.2 | 32 | 14.8 | 35.9 | 33.7 | 19.2 | 186.4 | 186 | 30.8 | 111.3 |
| | | 50% modulus (kgf/cm$^2$) | 42.5 | 67 | 60.2 | 127.1 | 122.0 | 42.5 | 209.4 | 298 | 47.5 | 179 |
| | | 50% modulus/10% modulus | 2.21 | 2.09 | 4.07 | 3.54 | 3.62 | 2.21 | 1.12 | 1.60 | 1.54 | 1.61 |
| | | Thickness of Paint film ($\mu$m) | 18 | 18 | 9 | 9 | 9 | 9 | 18 | 18 | 18 | 18 |
| Golf ball Properties | | Dry spin rate (rpm) | 6850 | 6900 | 6800 | 6860 | 6900 | 6850 | 6800 | 6800 | 6750 | 6810 |
| | | Wet spin rate (rpm) | 5400 | 5400 | 4900 | 5000 | 5100 | 4900 | 4500 | 4450 | 4500 | 4600 |
| | | Rough spin rate (rpm) | 3800 | 3750 | 3450 | 3600 | 3700 | 3500 | 2800 | 3200 | 3000 | 3200 |
| | | Wet spin retention Rs (%) | 79 | 78 | 72 | 73 | 74 | 72 | 66 | 65 | 67 | 68 |
| | | Rough spin retention Rs (%) | 55 | 54 | 51 | 52 | 54 | 51 | 41 | 47 | 44 | 47 |
| | | Appearance of Paint film | G | F | G | G | G | G | E | G | E | G |

Paint formulation: base/curing agent = NCO/OH (mole ratio)

Notes on Tables 4 and 5:
Polyol component 1: Polin #950 (hydroxyl value: 128 mgKOH/g) available from SHINTO PAINT
Polyol component 2: Polin #860 (hydroxyl value: 171 mgKOH/g) available from SHINTO PAINT
Polyisocyanate 1: Duranate TKA-100, isocyanurate of hexamethylene diisocyanate, available from Asahi Kasei Corporation
Polyisocyanate 2: Duranate 21S-75E, biuret-modified product of hexamethylene diisocyanate, available from Asahi Kasei Corporation,
Polyisocyanate 3: VESTANAT T1890, isocyanurate of isophorone diisocyanate, available from Degussa Golf balls No. 1 to No. 16 are the cases that the paint film has a martens hardness of 2.0 mgf/$\mu m^2$ or less, and a ratio (50% modulus/10% modulus) of 50% modulus to 10% modulus of 1.6 or more. As apparent from Tables No. 4 and No. 5, each of them has a high wet spin retention of 70% or more, and a high rough spin retention of 50% or more. Golf balls No. 9 to No. 12 used barium sulfate as a filler and the highly transparent paint film was obtained. With respect to golf balls No. 8 and No. 12, the appearance of the golf ball was slightly lowered, because the content of the filler is high. Golf balls No. 2, 3, 7, 11 are different from Golf balls No. 13 to No. 16 in the thickness of the paint film. The comparison indicated that the golf balls No. 2, 3, 7, 11 with a paint film having a thickness of 18 $\mu$m formed by overpainting two times showed a better spin retention.

The present invention is useful for painted golf balls. This application is based on Japanese Patent application No. 2010-087540 filed on Apr. 6, 2010, the contents of which are hereby incorporated by reference.

The invention claimed is:
1. A golf ball comprising
a golf ball body, and
a paint film formed on a surface of the golf ball body,
wherein the paint film has a martens hardness of 2.0 mgf/$\mu m^2$ or less, has a ratio (50% modulus/10% modulus) of 50% modulus to 10% modulus of 1.6 or more, and contains a filler in a content ranging from 10 mass % to 50 mass % and wherein a base resin constituting the paint film is polyurethane obtained by a reaction between a polyol component and a polyisocyanate component, and the polyisocyanate component includes a biuret-modified product of hexamethylene diisocyanate.

2. The golf ball according to claim 1, wherein the paint film has a 10% modulus of 100 kgf/cm$^2$ or less.

3. The golf ball according to claim 1, wherein the paint film has a 10% modulus of 50 kgf/cm$^2$ or less.

4. The golf ball according to claim 1, wherein the paint film has a 50% modulus of 30 kgf/cm$^2$ or more.

5. The golf ball according to claim 1, wherein the filler includes at least one filler selected from the group consisting of titanium oxide, barium sulfate, talc, calcium carbonate, clay, and white carbon.

6. The golf ball according to claim 1, wherein the golf ball has a cover with a Shore D hardness of 61 or less.

7. The golf ball according to claim 6, wherein the cover has a thickness ranging from 0.3 mm to 1.0 mm.

8. The golf ball according to claim 1, the paint film has a thickness ranging from 5 μm to 40 μm.

9. The golf ball according to claim 3, wherein the paint film has a 10% modulus of 5 kgf/cm$^2$ or more.

10. The golf ball according to claim 4, wherein the paint film has a 50% modulus of 200 kgf/cm$^2$ or less.

11. The golf ball according to claim 1, wherein the paint film has a ratio (50% modulus/10% modulus) of 50% modulus to 10% modulus of 15 or less.

12. The golf ball according to claim 1, wherein the polyol component has a hydroxyl value ranging from 10 mgKOH/g to 400 mgKOH/g.

13. The golf ball according to claim 1, wherein the polyisocyanate component contains a mixture of the biuret-modified product of hexamethylene diisocyanate and an isocyanurate of isophorone diisocyanate.

14. The golf ball according to claim 13, wherein a blending ratio of the biuret-modified product of hexamethylene diisocyanate and the isocyanurate of isophorone diisocyanate is such that the biuret-modified product of hexamethylene diisocyanate : the isocyanurate of isophorone diisocyanate is 1:0 to 0.7:0.3.

15. The golf ball according to claim 1, wherein the polyisocyanate component has an isocyanate content (NCO %) ranging from 0.5 mass % to 45 mass %.

16. The golf ball according to claim 1, wherein a molar ratio (NCO/OH) of the isocyanate group (NCO) of the polyisocyanate component to the hydroxyl group (OH) of the polyol component ranges from 1.0 to 1.4 in the reaction.

17. A golf ball comprising
a colored golf ball body, and
a paint film formed on a surface of the golf ball body,
wherein the paint film has a martens hardness of 2.0 mgf/μm$^2$ or less, a 10% modulus ranging from 5 kgf/cm$^2$ to 100 kgf/cm$^2$, a 50% modulus ranging from 30 kgf/cm$^2$ to 200 kgf/cm$^2$ and a ratio (50% modulus/10% modulus) of 50% modulus to 10% modulus of 1.6 or more, and wherein the paint film is a substantially transparent film containing a filler in a content ranging from 10 mass % to 50 mass % and wherein a base resin constituting the paint film is polyurethane obtained by a reaction between a polyol component having a weight average molecular weight ranging from 500 to 150,000 and a polyisocyanate component, and the polyisocyanate component includes a biuret-modified product of hexamethylene diisocyanate.

18. The golf ball according to claim 17, wherein the paint film has a thickness ranging from 5 μm to 40 μm.

19. The golf ball according to claim 1, wherein the golf ball has a cover with a Shore D hardness of 45 or less.

20. The golf ball according to claim 1, wherein the polyol component has a weight average molecular weight ranging from 500 to 150,000.

21. The golf ball according to claim 20, wherein the polyisocyanate component contains a mixture of a biuret-modified product of hexamethylene diisocyanate and an isocyanurate of isophorone diisocyanate having a blending ratio such that biuret-modified product of hexamethylene diisocyanate: isocyanurate of isophorone diisocyanate is in the range of 1:0 to 0.7:0.3.

22. A golf ball comprising
a golf ball body, and
a paint film formed on a surface of the golf ball body,
wherein the paint film has a martens hardness of 2.0 mgf/μm$^2$ or less, has a ratio (50% modulus/10% modulus) of 50% modulus to 10% modulus of 1.6 or more, and contains a filler in a content ranging from 10 mass % to 50 mass %;
wherein a base resin constituting the paint film is polyurethane obtained by a reaction between a polyol component and a polyisocyanate component, and the polyisocyanate component includes a biuret-modified product of hexamethylene diisocyanate;
wherein the filler includes at least one filler selected from the group consisting of titanium oxide, barium sulfate, talc, calcium carbonate, clay, and white carbon;
wherein the golf ball has a cover with a Shore D hardness of 61 or less;
wherein the cover has a thickness ranging from 0.3 mm to 1.0 mm;
wherein the polyisocyanate component contains a mixture of the biuret-modified product of hexamethylene diisocyanate and an isocyanurate of isophorone diisocyanate; and
wherein a blending ratio of the biuret-modified product of hexamethylene diisocyanate and the isocyanurate of isophorone diisocyanate is such that the biuret-modified product of hexamethylene diisocyanate: the isocyanurate of isophorone diisocyanate is 1:0 to 0.7:0.3.

* * * * *